Sept. 16, 1969 W. F. GLOVER 3,467,930
FRACTIONAL TURN ELECTRICAL WINDINGS
Filed April 7, 1967
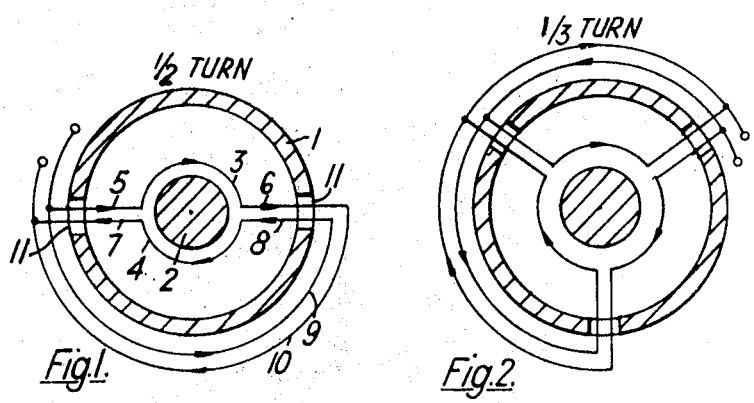
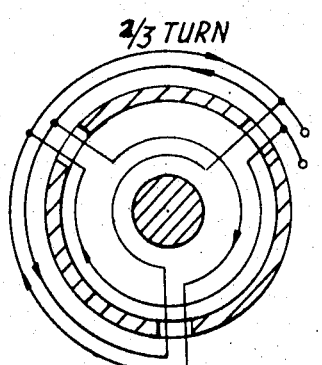
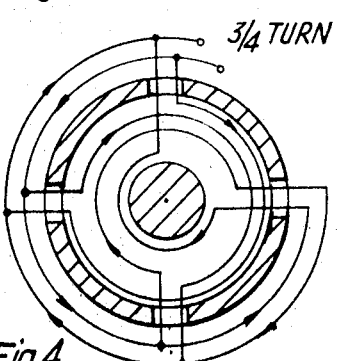
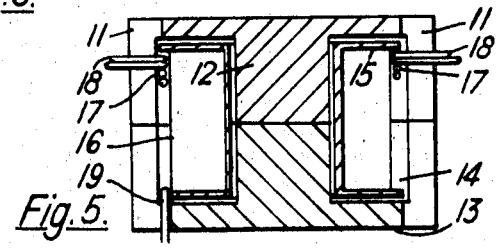
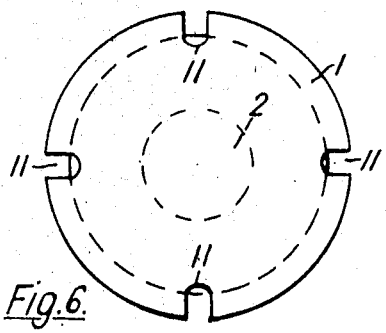
W. F. GLOVER
Inventor
By Delbert A Warner
Attorney

United States Patent Office 3,467,930
Patented Sept. 16, 1969

3,467,930
FRACTIONAL TURN ELECTRICAL WINDINGS
William Frank Glover, Kent, England, assignor to International Standard Electric Corporation, New York, N.Y., a corporation of Delaware
Filed Apr. 7, 1967, Ser. No. 629,265
Claims priority, application Great Britain, Apr. 22, 1966, 17,680/66
Int. Cl. H01f *15/02, 17/04*
U.S. Cl. 336—83      6 Claims

ABSTRACT OF THE DISCLOSURE

Windings are provided having a fractional number of turns $M/N$ which are able to link with the whole of a given magnetic flux. Windings are located within a cavity of a pot core of magnetic material having no air gap in the central limb. Lead out conductors of each of the sections of winding are taken through the outer shell of the core before connecting the sections in parallel with each other.

---

The present invention relates to electrical windings and in particular to a modification of a winding described in a copending application of W. F. Glover, No. 603,237 filed on Dec. 20, 1966.

In the parent application (603,237) there is described a winding for use in electrical inductors or transformers in which a pot core of magnetic material is provided and the winding is located within an air gap of the central limb of the core.

The essential feature of the winding in question is that it can be made to have any required number of turns which is either less than 1 or is a nonintegral multiple of 1, yet links with the while of a given magnetic flux. For this reason the winding is referred to as a "fractional turn" winding and may be either the only winding of an inductor or may be additional to other windings, for example, having an integral number of turns, used in an inductor or transformer. As stated above the fractional turn winding according to the parent specification is located in an air gap provided in the central limb of the core.

A primary object of the present modification is to provide a fractional turn winding when the central limb of the core has either substantially no gap or the gap is too small to accommodate the winding.

According to the invention there is provided an electrical winding linking substantially with the whole of a given magnetic flux distributed over a given area and having a number of turns $n$ equal to a fraction $M/N$, where M and N are integers and M is not an integral multiple of N, comprising N sections connected in parallel with each other, each of said sections linking with a fraction $M/N$ of the total flux, which winding is located within a cavity of a pot core of magnetic material the leadout conductors of each of the sections of the winding being taken through the outer shell of the core before connecting said sections in parallel with each other.

The invention will now be described with reference to the accompanying drawings in which FIGS. 1 to 4 show in schematic form examples of winding configurations.

FIGS. 5 and 6 show a section and a plan view of a pot core.

To bring out clearly the method of realising a fractional turn winding FIGS. 1 to 4 show the method of interconnecting the individual sections forming the winding for ½, ⅓, ⅔ and ¾ turns. FIG. 1 shows the arrangement to obtain a "half turn" winding. In this figure, 1 and 2 indicate diagrammatically sections through the outer shell and the central limb of the pot core respectively. The winding comprises the sections 3 and 4 which are connected by lead out conductors 5, 6 and 7, 8 and busbars 9 and 10 to a pair of terminals. The lead out wires are taken through apertures 11 in the outer shell of the core. From FIG. 1 it will be seen that the two half turn windings 3 and 4 are connected in parallel with each other and that the lead out wires and the bus bars carry currents in opposite directions i.e. are non-inductive. In this arrangement each of the sections links with one half of the total flux. Thus the half turn section formed by conductor 4 and its associated lead out wires and connecting leads to the terminals link with the flux in the lower half of the outer shell of the core. The other half turn section formed by the conductor 3 and its leads is seen to link with the flux in the central limb of the core and the lower half of the outer shell. Since the flux traverses the central limb and the outer shell in opposite directions and its magnitude in the central limb is twice that in one half of the outer shell, conductor 3 links with one half of the total flux and will have therefore induced in it an EMF equal in magnitude to that induced in section formed by conductor 4.

In the arrangement of the parent specification all the sections of the fractional turn winding couple only with the flux in the central limb of the core.

When a ⅓ turn winding is required it will comprise three sections connected in parallel, each linking with ⅓ of the total flux. This arrangement is shown in FIG. 2. Further examples of fractional turn windings giving ⅔ and ¾ turns are shown in FIGS. 3 and 4. It will be apparent that all the above arrangements have the following features in common.

Each section of the fractional turn winding links with the same fraction of the total flux and has the same EMF induced in it.

All the sections of the fractional turn winding are connected in parallel with each other outside the pot, i.e. after the leadout wires of the sections have been taken through the outer shell of the core.

The direction of current flow in each section of the fractional turn winding is the same.

The lead out wires are taken in pairs through apertures in the outer shell of the core, one conductor of a pair being an end of one section and the other the start of an adjacent section.

The conductors of a pair of lead out wires carry current in opposite directions, so that they are substantially non inductive.

From the above examples the general procedure to layout a required fractional turn winding becomes apparent.

The required fractional turn is expressed as a fraction $M/N$.

Then N gives the number of sections to be connected in parallel.

$M/N$ gives the fraction of the whole flux linking with each section.

$$\frac{360 \cdot M}{N}$$

gives the segment angle subtended by each section.

The circumference of the outer shell of the core must be provided with N equidistantly spaced apertures.

The method of realising fractional turns is not limited to $$\frac{M}{N} < 1$$

Thus 1¼ turns=⁵⁄₄ which means a winding having 4 sections, each section linking with ⁵⁄₄ of the total flux. In general however the integral turns would be provided in a conventional manner, by a winding having an integral number of turns, these turns being connected in series with the winding providing the fraction of one turn.

The fractional turn winding described in the above-mentioned parent specification was wound on a small spool located in an air gap provided in the central limb of the pot core. The individual sections forming the fractional turn winding according to the present invention do not require a separate spool and are wound on the same spool which carries the winding having an integral number of turns.

A practical arrangement is shown in FIGS. 5 and 6. The pot core comprises two half cores 12 and 13, each having an outer shell 1 and a central limb 2. In one or both half cores the outer shell is provided with the required number of apertures 11 through which the lead out wires are taken out from within the cavity 14 of the core. A spool 15 is positioned within the cavity of the core and is provided with a winding or windings 16 having the required integral number of turns. The sections of the winding constituting the fraction of one turn are wound over this winding as indicated at 17, the leadout wires of this winding being taken out as indicated by 18.

In FIGS. 1 to 4 the individual sections of the winding are shown for clarity as being connected in parallel with each other by means of bus bars 9 and 10. Since each pair of lead out wires is in effect bifilar, it is more convenient in practice not to use the bus bars, but to join the pairs of leads at the terminals of the inductor or transformer. These terminals are not shown in FIGS. 5 and 6.

In general each section of the fractional turn winding will be less than one complete turn. It will therefore be convenient to provide at least one cheek of the spool 15 with a number of equidistantly spaced slots, each slot opposite an aperture 11 in the core and to take the lead out wires through these slots as is indicated by 19.

It is to be understood that the foregoing description of specific examples of this invention is made by way of example only and is not to be considered as a limitation on its scope.

What I claim:

1. An electrical winding linking substantially with the whole of a given magnetic flux distributed over a given area and having a number of turns $n$ equal to a fraction $M/N$, where M and N are integers and M is not an integral multiple of N, comprising N sections connected in parallel with each other, each of said sections linking with a fraction $M/N$ of the total flux, which winding is located within a cavity of a pot core of magnetic material the lead out conductors of each of the sections of the winding being taken through the outer shell of the core before connecting said sections in parallel with each other.

2. A winding as claimed in claim 1 in which the sections of the winding are supported on a spool located within said cavity of the pot core, the outer shell of the magnetic core being provided with N apertures uniformly distributed over the periphery of the shell through each of which apertures two lead out wires are taken out, one of said wires being a beginning of one section and the other wire being an end of another section, the currents in both wires being substantially equal in magnitude, but flowing in opposite directions.

3. A winding as claimed in claim 2 in which each section of the winding subtends an angle of $360.M/N$ degrees along the periphery of the spool, the angular separation between the start of end leads of two adjacent sections is $360/N$ degrees and the angular overlap between two adjacent sections is $360(M-1)/N$ degrees.

4. A winding as claimed in claim 3 in which at least one cheek of the spool is provided with a number of equidistantly spaced radial slots which number is equal to the number of apertures in the outer shell of the core.

5. A winding as claimed in claim 3 in which the spool carries in addition to the sections of said winding at least one further winding which is either separate from the said winding or is connected in series with it, but which winding has an integral number of turns.

6. A winding as claimed in claim 1 in which the magnetic core has substantially no air gap.

References Cited

UNITED STATES PATENTS 3,098,990   7/1963   Farrand et al. _____ 336—172

DARRELL L. CLAY, Primary Examiner

T. J. KOZMA, Assistant Examiner

U.S. Cl. X.R.
336—172, 180